(12) United States Patent
Golding

(10) Patent No.: US 9,289,843 B2
(45) Date of Patent: Mar. 22, 2016

(54) TANDEM STRIP CLADDING METHOD AND APPARATUS

(75) Inventor: Mark S. Golding, Yateley Hampshire (GB)

(73) Assignee: LINCOLN GLOBAL, INC., City of Industry, CA (US)

( * ) Notice: Subject to any disclaimer, the term of this patent is extended or adjusted under 35 U.S.C. 154(b) by 807 days.

(21) Appl. No.: 13/175,188

(22) Filed: Jul. 1, 2011

(65) Prior Publication Data

US 2013/0004674 A1    Jan. 3, 2013

(51) Int. Cl.

| | |
|---|---|
| *B23K 9/173* | (2006.01) |
| *B23K 9/18* | (2006.01) |
| *B23K 25/00* | (2006.01) |
| *B23K 9/04* | (2006.01) |
| *B23K 9/12* | (2006.01) |
| *B23K 9/16* | (2006.01) |

(52) U.S. Cl.
CPC . *B23K 9/04* (2013.01); *B23K 9/121* (2013.01); *B23K 9/162* (2013.01); *B23K 9/1735* (2013.01); *B23K 9/188* (2013.01); *B23K 25/005* (2013.01)

(58) Field of Classification Search
CPC .............................. B23K 9/121; B23K 25/005
See application file for complete search history.

(56) References Cited

U.S. PATENT DOCUMENTS

| | | | |
|---|---|---|---|
| 2,756,311 A | 7/1956 | Persson et al. | |
| 3,924,092 A * | 12/1975 | Lessmann et al. | ......... 219/76.15 |
| 2003/0052110 A1 | 3/2003 | Gandy et al. | |
| 2008/0190900 A1* | 8/2008 | Zhang et al. | ............. 219/121.45 |
| 2010/0326963 A1* | 12/2010 | Peters et al. | ................ 219/76.14 |

FOREIGN PATENT DOCUMENTS

| | | |
|---|---|---|
| DE | 214078 | 10/1984 |
| GB | 2049521 | 12/1980 |
| JP | 57-199564 A | 12/1982 |
| JP | 57-202970 A | 12/1982 |
| JP | 58122193 | 7/1983 |
| JP | 58-202987 A | 11/1983 |
| JP | 2003236665 | 8/2003 |
| JP | 2007-268551 A | 10/2007 |

OTHER PUBLICATIONS

International Search Report and Written Opinion for Application No. PCT/IB2012/001303, mailing date Nov. 5, 2012, 7 pages.
Japanese Patent Application No. 2014-517969, Office Action, 12 pages, Jan. 6, 2015.
P. Blaskovic and S. Lesnak, "Electroslag surfacing with a double strip electrode in the horizontal position", Welding International 1990, pp. 238-240, Welding Research Institute, Bratislava.

\* cited by examiner

*Primary Examiner* — Dah-Wei D Yuan
*Assistant Examiner* — Stephen Kitt
(74) *Attorney, Agent, or Firm* — Perkins Coie LLP

(57) ABSTRACT

A system and method of cladding is provided where first and second cladding heads are provided, where each cladding head delivers its own respective cladding electrode to a common molten puddle.

26 Claims, 4 Drawing Sheets

TANDEM STRIP CLADDING METHOD AND APPARATUS

BACKGROUND OF THE INVENTION

1. Field of the Invention

Devices, systems, and methods consistent with the invention relate to cladding with tandem strip electrodes.

2. Description of the Related Art

Cladding with strip electrodes is known in the industry. Typically strip electrodes are used for cladding, because of their large width and low penetration resulting in a large cladding area but low admixture with the base metal. This is especially true of electro-slag cladding. However, cladding processes can be slow thus decreasing the efficiency of a cladding operation. Efforts have been made to attempt increase the deposition speed/rates during strip cladding, but these efforts have not, resulted in a suitable cladding operation.

BRIEF SUMMARY OF THE INVENTION

An exemplary embodiment of the present invention is a cladding system and method where first and second cladding heads are provided, where each cladding head delivers its own respective cladding electrode to a common molten puddle. Thus, at least two cladding electrodes are utilized in the same cladding operation. In embodiments of the present invention, each of the respective cladding heads is connected to their own respective power supplies.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
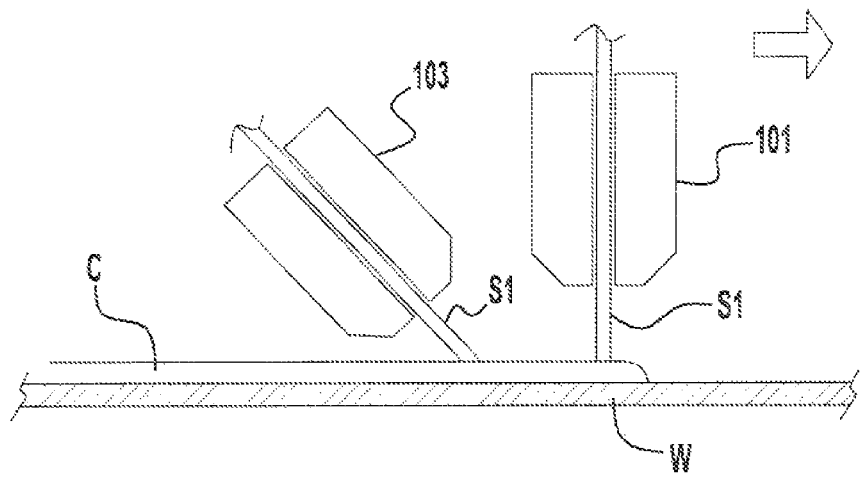
FIG. 1 illustrates a diagrammatical representation of cladding with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 2:
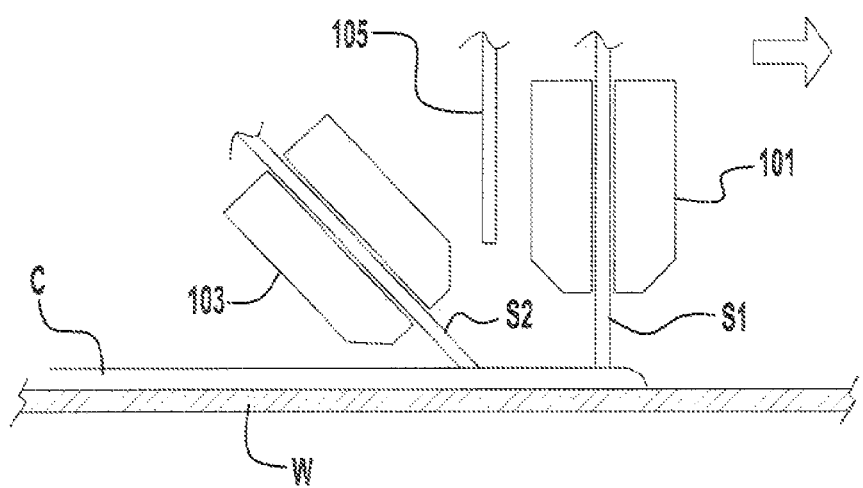
FIG. 2 illustrates another diagrammatical representation of cladding with an exemplary embodiment of the present invention.
Figure 3:
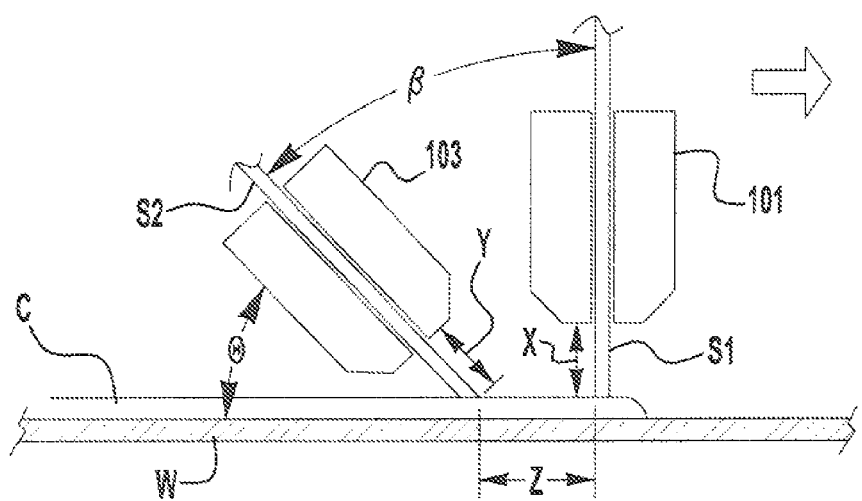
FIG. 3 illustrates a further diagrammatical representation of cladding with an exemplary embodiment of the present invention.

FIGS. 1 through 3 show diagrammatical representations of cladding with exemplary embodiments of the present invention. In exemplary embodiments of the present invention a first or leading cladding head 101 is positioned upstream (in the travel direction) of a second or trailing cladding head 103. Each of the heads 101 and 103 deliver a strip electrode (S1 and S2, respectively) to a work piece W to be clad so as to create a cladding layer C on the workpiece W. Each of the electrodes S1 and S2 contact a common puddle, which is initially created by the leading cladding head 101 and electrode S1. The heads 101 and 103 are positioned such that they are tandem with respect to each other. In other words, in exemplary embodiments of the invention, the side edges of the respective electrodes S1 and S2 are aligned with each other in the cladding direction.

An example of the cladding process that can be used with embodiments of the present invention is electro-slag cladding. The present invention is not limited in this regard.

Furthermore, the cladding heads 101 and 103 can be constructed as known or commonly used cladding heads, which are typically utilized for cladding a workpiece with a strip electrode.

As shown in FIGS. 1 through 3, at least one of the cladding heads 101 and 103 can be angled with respect to the workpiece surface to be clad. In the exemplary embodiments shown the trailing head 103 is shown angled with respect to the surface. This angling is to aid in the penetration of the trailing electrode S2 with the puddle to optimize the cladding operation. Further, angling at least one of the heads 101 and 103 allows the proximity of the heads to be such that the respective strips can be easily directed to the same molten puddle. This is discussed more fully below. In the exemplary embodiments shown in FIGS. 1 to 3, the trailing head 103 is angled while the leading head 101 is positioned vertically with respect to the workpiece W. However, aspects of the present invention are not limited to this configuration. For example, it is contemplated that the leading head 101 is angled with respect to the workpiece W while the trailing head is positioned normal to the workpiece W. In another exemplary embodiment, both of the heads 101/103 are angled such that they are normal to the workpiece W. That is, the cladding strips impact the weld puddle normal to the surface of the workpiece W. Alternatively, it is also, contemplated that in exemplary embodiments of the present invention, both the leading and trailing heads 101/103 are angled with respect to the surface of the workpiece W. However, it should be noted that as angling increases it may become more difficult to start the cladding operations.

Referring to FIG. 3, the distance Z between the tips of the electrodes S1 and S2 can vary depending on various operational parameters. However, the distance Z should be greater than 0 mm so as to prevent the electrodes S1 and S2 from contacting each other. Furthermore, the distance Z should not be too great such that the trailing electrode S2 does not make contact with the same molten puddle as the leading electrode S1. In exemplary embodiments of the present invention, the distance Z is from 5 to 50 mm. In further exemplary embodiments, the distance Z is in the range of 5 to 20 mm.

In another exemplary embodiment a heat source, for example a laser device is positioned between the leading head 101 and the trailing head 103. The heat source provides a heat input into the puddle to ensure the puddle is maintained in a molten state. In such an embodiment the distance Z between the electrodes S1 and S2 can be increased. Of course, because it is needed to maintain heat across the entire width of the cladding strips the heat source should be provided across the width of the weld puddles. For example, if the heat source is a laser or plasma the heat source should be oscillated across the width of the weld puddle to keep the puddle molten across its width.

As further shown in FIG. 3, the leading electrode S1 has a stick out of X and the trailing electrode S2 has a stick out of Y. In exemplary embodiments of the present invention, the stick outs X and Y are the same. However, in other exemplary embodiments the stick outs X and Y are different from each other. For example, the stick out X of the electrode S1 is shorter than the stick out Y of the electrode S2. In an exemplary embodiment of the present invention, the stick out X is in the range of 40 to 70 mm while the stick out Y is in the range of 50 to 80 mm. In a further exemplary embodiment, the stick out Y is about 10 mm less than the stick out X. Of course, it is understood that these parameters can be optimized depending on the desired results and operational parameters being employed. It is noted that by increasing the length of stick out the level of dilution in the weld decreases, thus longer stick outs are beneficial. However, when increasing the stick out length the amount of heat built up in the strips S1 and S2 can be increased. When the heat in the strips is too high the columnar strength of the strips can be degraded such that the strips buckle. This is highly undesirable. Therefore, to optimize the stick out, each of these factors should be taken into account.

Exemplary embodiments of the present invention, while providing increasing deposition rates, are able to provide dilution levels of 10% or less.

It is noted that by changing the distance Z between the electrodes S1 and S2 the stick out can be changed. Much of this is dictated by the size of the respective heads 101 and 103. For example, as the distance Z increases the respective stick out distances X and Y can be decreased as it will be possible to move the heads 101 and 103 closer to the workpiece W.

In an exemplary embodiment, the angle θ between the trailing electrode S2 and the surface is in the range of 15 to 90 degrees. However, in further exemplary embodiments the angle θ is in the range of 30 to 60 degrees. Such angling provides the benefits discussed above. Further, although the angle θ is shown in FIG. 3 as relating to the trailing electrode S2, in other exemplary embodiments it is the leading electrode S1 which is angled θ which respect to the surface of the workpiece W. In further exemplary embodiments, the electrodes S1 and S2 are angled β with respect to each other. In an exemplary embodiment, the angle β between the electrodes is in the range of 0 to 75 degrees, where 0 degrees indicates that the electrodes S1 and S2 are essentially parallel to each other as they impact the puddle. In a further exemplary embodiment, the angle β between the electrodes is between 30 and 60 degrees. Thus, in some exemplary embodiments of the invention, both electrodes S1 and S2 are angled with respect to the surface of the workpiece W. It is noted that in the foregoing discussion the angle measurements are discussed relative to the respective angles of the electrodes S1 and S2 at or near the impact of the electrodes at the molten puddle.

In an exemplary embodiment of the present invention, the electrodes S1 and S2 are identical, in both size and chemistry. However, in other exemplary embodiments the electrodes S1 and S2 can be different. For example, it is contemplated that the electrodes S1 and S2 have different thicknesses and/or widths to optimize a cladding operation. For example, it may be desirable to providing cladding having a stepped or layered structure such that the leading electrode S1 is wider than the trailing electrode S2. In other exemplary embodiments it may be desirable to provide a cladding with different physical properties based on its thickness such that the leading electrode S1 has a different chemistry than the trailing electrodes S2. For example, it is contemplated that the leading electrode S1 can be of a 309L type stainless steel while the trailing strip. S2 can be of a 316L type stainless steel.

FIG. 2 depicts another exemplary embodiment of the present invention where a magnetic steering probe 105 is placed between the leading head 101 and the trailing head 103. The utilization of magnetic fields and magnetic steering is generally known in the welding industry to aid in controlling and stabilizing a slag pool and resulting molten deposit to counteract the magnetic-fields—generated by the welding operation—which influence the positioning and stability of the welding operation. The probe 105 is utilized similarly with respect to embodiments of the present invention. Specifically, the probe 105 is utilized to generate a magnetic field which aids in stabilizing the two respective cladding operations. For example, the magnetic probe can be used to reduce the influence the lead electrode S1 onto the trailing electrode S2, and vice-versa. In an exemplary embodiment of the present invention, the probe 105 is positioned closer to the leading electrode S1 than the trailing electrode S2. This is because; in certain embodiments (as will be explained more fully below) the leading electrode S1 will generate a larger magnetic field—because the leading electrode S1 will have more power than the trailing electrode S2. Overall, the positioning and control of the probe 105 should be optimized to provide a stable cladding operation. In another exemplary embodiment, the magnetic probes are positioned on the sides the strips during welding. The position of the probes on the outside can help flatten and stabilize the weld puddle by interfering with the magnetic fields drawing the weld puddle to the center of the weld.

Figure 4:
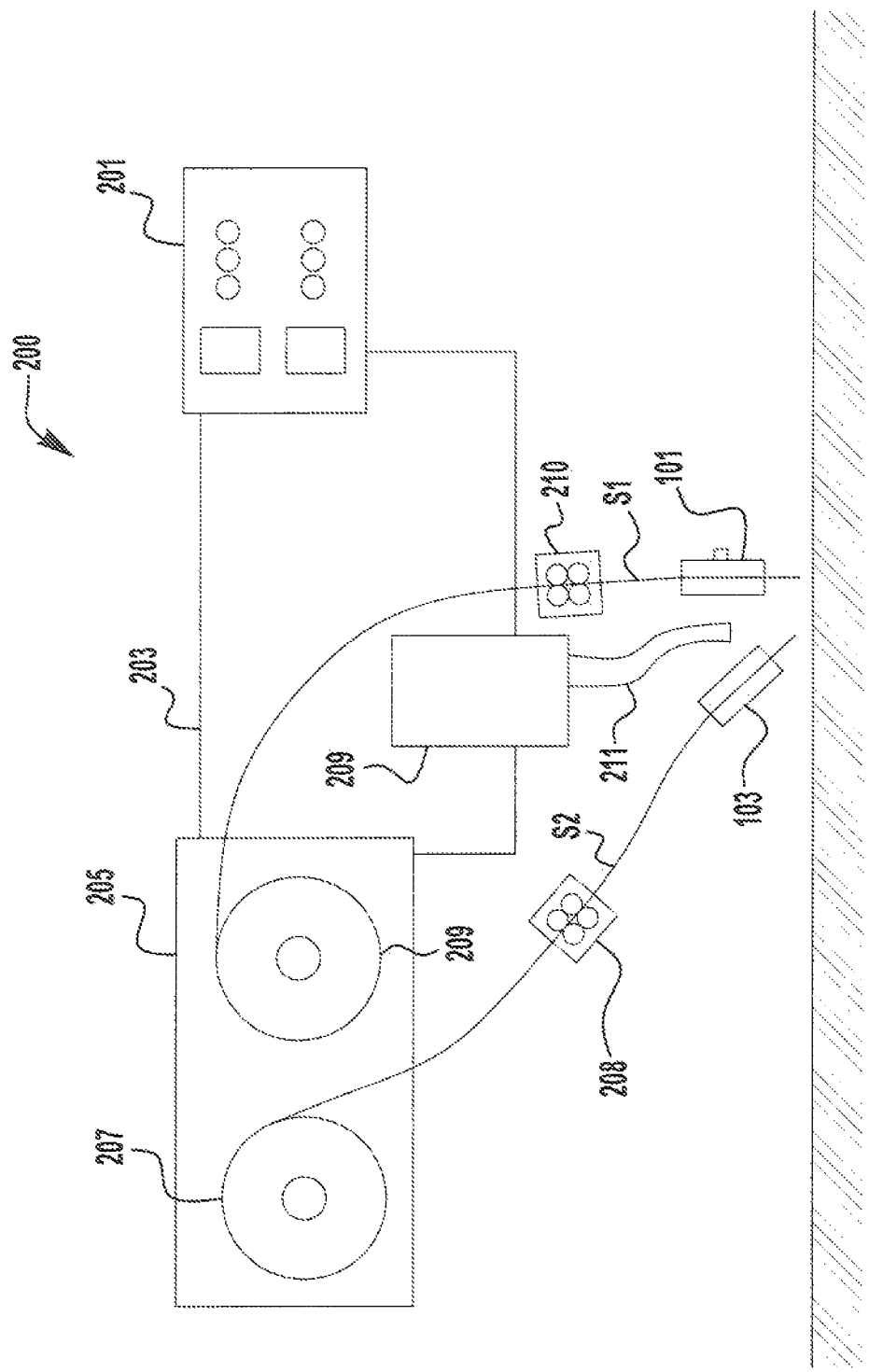
FIG. 4 illustrates a diagrammatical representation of a cladding assembly in accordance with an exemplary embodiment of the present invention.

Turning now to FIG. 4, a cladding assembly 200 in accordance with an exemplary embodiment of the present invention is shown. In an exemplary, embodiment, the cladding assembly 200 can be of a carriage type design which is capable of being moved along a workpiece W. Alternatively, the carriage assembly 200 can be stationary such that the workpiece W is moved relative to the assembly 200 to effect a cladding operation. The cladding assembly 200 can contain a control panel 201 which is configured to provide user controls and inputs to the cladding operation. Such control panels 201 are known in the industry and can control such things as electrode feed speed, travel speed, weld control (power, current, voltage, etc.), flux control, etc. The assembly 200 can further contain an electrode mounting structure 205 upon which electrode rolls 207 and 209 are mounted to provide the electrodes S1 and S2 to the heads 101 and 103. Feeding mechanisms 208 and 210 can also be mounted to the assembly 200 so as to feed the electrodes S1 and S2 to the heads. The configuration and construction of the rolls 207/209 and feeding mechanisms 208/210 can be in accordance with any known or used devices, as embodiments of the present invention are not limited in this regard. Moreover, aspects of the present invention are not limited by the physical structure or positioning of the rolls 207/209 or the driving mechanisms 208/210.

In a further exemplary embodiment of the assembly 200, a flux delivery system containing a flux tank 209 and delivery tube 211 is utilized to deliver a shielding flux to the cladding process. Such flux delivery systems are known and need not be discussed in detail herein. In an exemplary embodiment of the present invention, a high speed electro-slag flux can be utilized which have the capacity to maintain metal transfer while minimizing dilution levels.

Although not expressly shown in FIG. 4, a magnetic probe assembly (such as shown in FIG. 2) can be included in the assembly 200 as needed. Further, in additional exemplary embodiments a flux and/or fume removal or vacuum system may be utilized. For example, a flux extraction vacuum (not shown) may also be mounted to the assembly 200 so as to remove flux during the cladding process. Such systems are known in the cladding and welding industries.

Figure 5:
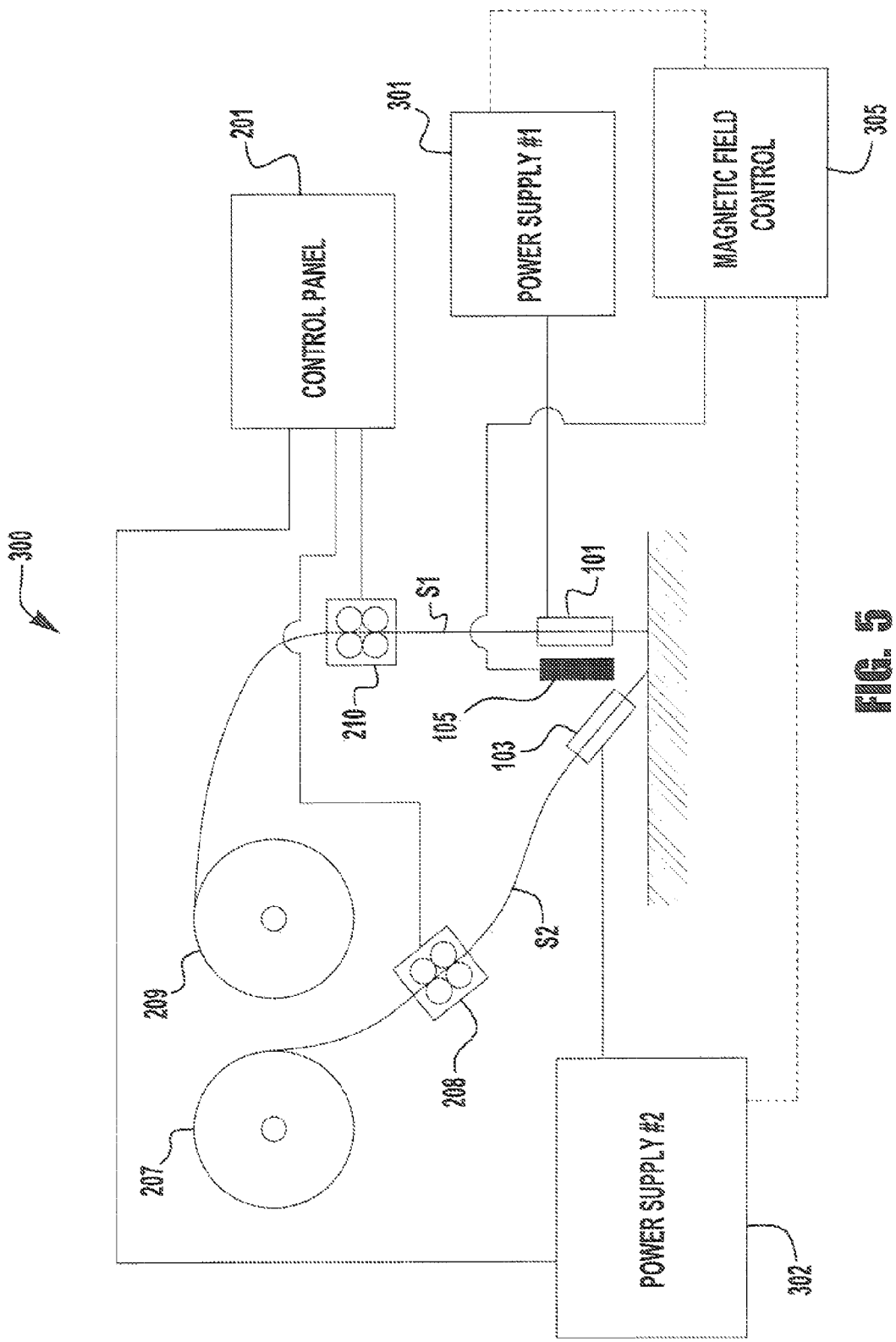
FIG. 5 illustrates a diagrammatical representation of a cladding system in accordance with an exemplary embodiment of the present invention.

Turning now to FIG. 5, a cladding system 300 is depicted. Exemplary embodiments of the system 300 comprise two separate power supplies 301 and 303, such that a first power supply 301 is coupled to the leading head 101 and the second power supply is coupled to the trailing head 103. Each of the respective power supplies provides a cladding signal (voltage and current) to the respective heads such that each respective electrode S1 and S2 is sufficiently delivered to and deposited in the common melted puddle. The construction and operation of such power supplies known. As indicated previously the power supplies 301/303 can provide an electro-slag cladding signal to the heads 101/103. In an exemplary embodiment of the present invention, each of the power supplies 301/303 can be controlled via the control panel 201. Furthermore, in additional exemplary embodiments each of the power supplies 301/303 communicate with each other during operation. For example, it is contemplated that each of the respective power supplies 301/303 work together so as to control the overall heat input into the cladding process. Furthermore, it may be beneficial to start the leading strip S1 prior to the trailing strip S2. In such an embodiment the power supply 301 starts the cladding operation and as soon as a weld puddle is created and stabilized the second power supply 303 is started for the cladding operation. In an exemplary embodiment of the present invention, both the first and second power supplies are operated in constant voltage ("CV") mode. In a further exemplary embodiment of the present invention, a variable welding waveform can be utilized, such as the type generated by Power Wave power supplies manufactured by The Lincoln Electric Company of Cleveland, Ohio. Variable waveforms can have waveform profiles in which either or both of the negative and positive currents can be varied during the welding operation. In one aspect of the present invention, each of the power supplies 301/303 supply the same cladding signal (voltage and current) to the respective electrodes S1 and S2. However, in additional embodiments, the signal provided by the first power supply 301 can be different than the signal provided by the second power supply 303. For example, it is contemplated that the first power supply 301 provides a signal with a higher power (which can be accomplished, for example, through utilization of a higher current or voltage, or both) than the second power supply 303.

In exemplary embodiments of the present invention, the leading electrode has a higher current level than the trailing electrode. Such a configuration allows the leading electrode to perform the majority of deposition into the molten puddle, while the trailing electrode is then used to simply deposit more material for the cladding operation. In exemplary embodiments of the present invention, the trailing electrode has an average current level which is in the range of 100 to 800 amps less than that of the leading electrode. In other exemplary embodiments, the trailing electrode has an average current which is in the range of 250 to 600 amps less than that of the leading electrode.

It is noted that although FIG. 5 shows two discrete power supplies 301/303, embodiments of the present invention do not require the power supplies to be two completely separate physical units having two distinct housings, etc. It is contemplated that the separate power supplies can be incorporated into a single integral housing, such that items 301/303 represent discrete power supply systems within a single integral unit. The discrete power supplies 301/303 should be capable of delivering power signals having different parameters, as needed.

As discussed briefly earlier, cladding with a strip electrode is known. However, when trying to create a cladding layer of a certain thickness such a process can be slow. The utilization of exemplary embodiments of the present invention provides for a significant increase in cladding speed while delivery the same or an increased level of cladding thickness. Furthermore, the utilization of a trailing electrode, deposited by its own dedicated power supply, will stabilize the dilution level of the cladding. Additionally, the use of separate power supplies with the separate cladding heads will allow the respective heads to operate at normal, or otherwise lower, power levels—thus eliminating the need to rely on excessively high currents through a single head for a particular deposition rate. Such high currents can cause excessive heating and slippage of the strip during cladding, which can adversely affect the quality and durability of the deposited cladding layer.

It has been discovered that there are various advantages in utilizing embodiments of the present invention. For example, it has been discovered that improvements in heat input and operational efficiency can be achieved. For example, it has been discovered that increased deposition speeds can be achieved for a cladding thickness without a significant or detrimental increase in overall heat input into the puddle. Further, it has been discovered that the use of tandem cladding electrodes results in a nominal bead width which is larger than that achieved with a single electrode, thus resulting in an increased coverage rate.

The tables below provide summaries of data for exemplary embodiments of the present invention, as compared to prior art cladding operations. These tables demonstrate benefits of the present invention. It is noted, that shown in the tables below are representative heat input calculations in the traditional kJ/mm relationship and a kJ/mm² relationship, which takes into account the width of the nominal bead width and is more representative of the overall heat input. For reference, the following equations were used for the heat input calculations:

$$kJ/mm = (A \times V \times 60)/(1{,}000 \times S), \text{ where}$$

A=Total Average Current, V=Volts, S=Speed (mm/min); and $$kJ/mm^2 = (A \times V \times 60)/(1{,}000 \times S \times B), \text{ where}$$

A=Total Average Current, V=Volts, S=Speed (mm/min), and B=nominal bead width (mm).

In exemplary embodiments of the present invention, the strip heat input is in the range of 0.25 to 0.10 kJ/mm², and in other exemplary embodiments the strip heat input is in the range of 0.15 to 0.20 kJ/mm². Further, in exemplary embodiments of the present invention, the deposition rates are in the range of 1.00 to 1.50 m²/hr. Additionally, in exemplary embodiments of the present invention, the travel speed of the cladding process is in the range of 20 to 40 cm/min. In another alternative embodiment of the present invention, the travel speed is in the range of 25 to 35 cm/min.

Further, the current data shown below is average current, as a constant voltage was utilized.

Table 1, below, provides a summary of data from six exemplary welding passes in a tandem strip electrode configuration.

| Weld No. | Amps (Lead/Trail) | Volts (Lead/Trail) | Speed (cm/min) | Mag. Steering Amps (N/S) | Bead Width (mm) | Bead Height (mm) | Heat Input (kJ/mm$^2$) | Heat Input (kJ/mm) | Depo. Rate (m$^2$/hr) |
|---|---|---|---|---|---|---|---|---|---|
| 1 | 1250/600 | 25/25 | 25 | 2/3 | 70 | 4.5-5 | 0.20 | 11.10 | 1.05 |
| 2 | 1250/600 | 25/25 | 25 | 2/3 | 72 | 4.5-5 | 0.20 | 11.10 | 1.08 |
| 3 | 1250/600 | 25/25 | 25 | 2/3 | 72 | 4.5-5 | 0.20 | 11.10 | 1.08 |
| 4 | 1250/800 | 25/25 | 30 | 2/3 | 72 | 4.5-5 | 0.18 | 10.25 | 1.30 |
| 5 | 1250/1000 | 25/25 | 35 | 2.5/2.5 | 70 | 4.5-5 | 0.17 | 9.64 | 1.47 |
| 6 | 1250/800 | 25/25 | 30 | 2.5/2.5 | 73 | 4.5-5 | 0.18 | 10.25 | 1.31 |

It is noted that all of the above welds were conducted with 60 mm wide electrodes having a thickness of 0.5 mm, and the electrodes were an EQ309L and EQ316LO type electrodes. Further, type ES200 flux was used.

The following Table 2 compares Weld Nos. 3, 4, and 5 from Table 1 (above) with cladding using a single cladding electrode and demonstrates some of the benefits of the present invention. (All of the bead thicknesses (bead height) for the single beads (below) were of the similar thickness in the tandem passes—a nominal thickness of 4.5 to 5 mm).

| Weld No. | Bead Width (mm) | Depo. Rate (m$^2$/hr) | Total Amps | Volts | Speed (cm/min) | Heat Input (kJ/mm$^2$) | Heat Input (kJ/mm) | Strip Width (mm) |
|---|---|---|---|---|---|---|---|---|
| Ex. 1 | 65 | 0.70 | 1250 | 25 | 18 | 0.16 | 10.14 | 60 |
| Ex. 2 | 95 | 1.03 | 1800 | 25 | 18 | 0.16 | 15.00 | 90 |
| Ex. 3 | 125 | 1.35 | 2400 | 25 | 18 | 0.16 | 20.00 | 120 |
| 3 | 72 | 1.08 | 1850 | 25 | 25 | 0.20 | 11.10 | 60 |
| 4 | 72 | 1.30 | 2050 | 25 | 30 | 0.18 | 10.25 | 60 |
| 5 | 70 | 1.47 | 2250 | 25 | 35 | 0.17 | 9.64 | 60 |

As shown in the Tables above, exemplary embodiments of the present invention provide performance improvements over the use of a single cladding electrode. For example, the nominal bead width for a 60 mm wide strip was improved from 65 mm to 70 to 72 mm, thus providing a wider bead and more coverage for a single pass. It is noted that with the single strip configuration, the cladding head can become unstable at higher feed rates for the cladding strips, which can cause the feed rate and thus the travel speed to be a limiting factor when trying to achieve thick cladding layers.

In another example of the present invention, not shown in the tables above, this improved bead width can be shown. In a single strip cladding operation a 60×0.5 mm strip was used with an ES200 flux. A current of 1,450 amps was used with 25 volts and a 5 mm thick cladding layer was deposited with a nominal bead width of 64 mm and a 10% dilution level. However, when using a tandem strip configuration, where the lead strip used 1,250 amps and the trail strip used 600 amps, the same bead thickness was obtained with a bead width of 72 mm. Thus, for an additional 400 amps a 12% gain in the width of the bead was achieved. This increase can create significant savings in coverage time during cladding operations.

Figure 6:
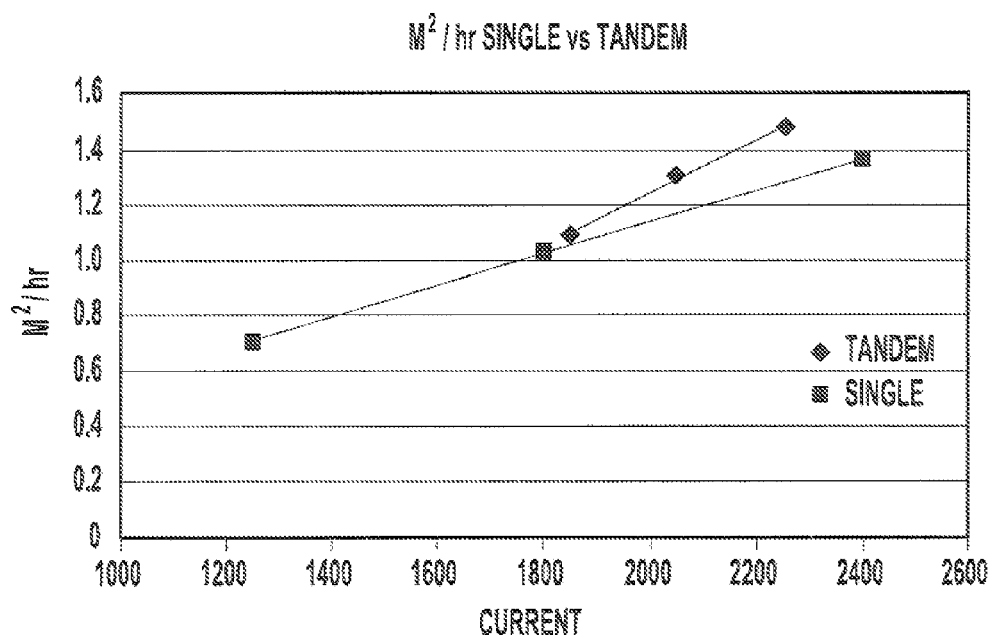
FIG. 6 illustrates a graph of exemplary current and deposition rate data comparing a single electrode system to embodiments of the present invention.
Figure 7:
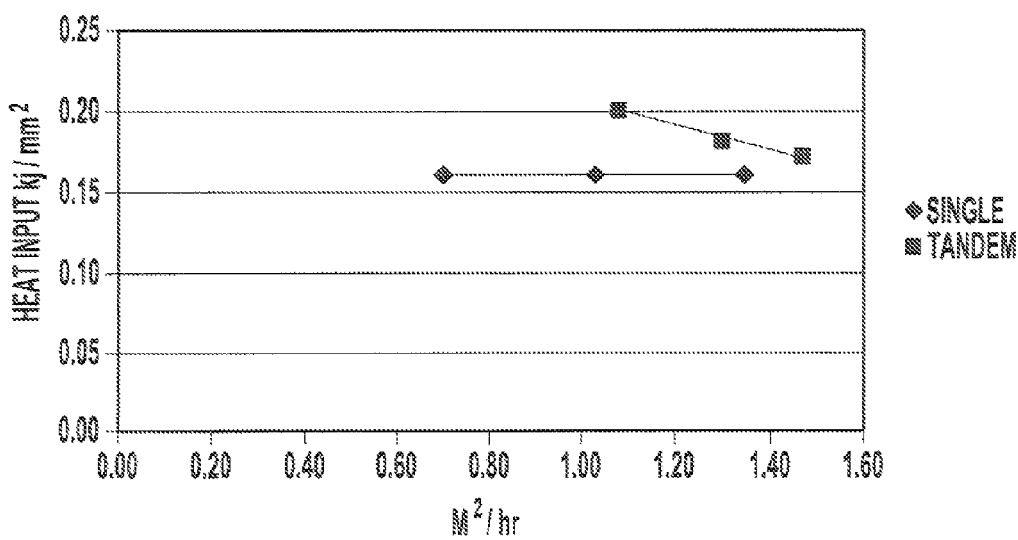
FIG. 7 illustrates a graph of exemplary heat input and deposition rate data comparing a single electrode system to embodiments of the present invention.

Further, when looking at Weld No 5 it can be seen that a travel speed of 35 cm/min could be obtained, with a deposition rate of 1.47 m$^2$/hr with only a modest increase in overall heat input 0.01 kJ/mm$^2$ over the use of a 120 mm wide electrode, and an overall decrease in the amount of amps needed for the weld (2,250 as compared to 2,400). This can also be seen in FIGS. 6 and 7 which graphically illustrate the deposition rate data when compared to current and heat input. As this data shows, exemplary embodiments of the present invention provide benefits over the use of a single strip electrode, and can do so while decreasing the amount of energy consumed in the process and doing so with only modest increases in the overall heat input into the weld. Further, FIG. 7 unexpectedly shows that, in a tandem configuration, even though the deposition rate is increasing, the overall heat input into the workpiece is decreasing.

Further, because of the reduced heat input from the tandem cladding operation, cladding can be effectively done on thinner workpieces than could normally be done with a single electrode. When using a single cladding electrode the heat input can be so high that thinner workpieces (for example 50 mm) would warp at the higher current levels. Because the tandem process provides less overall heat input, even at the high current levels, cladding can be accomplished easily on thinner work pieces.

Additionally, embodiments of the present invention allow for faster cladding than over previous methods, while maintaining acceptable dilution levels. As travel speed for a cladding operation increases—for a given current level—the thickness of the cladding layer gets thinner and the dilution level increases. As the dilution level increases the ability to control the chemistry of the cladding decreases, which is disadvantageous.

However, because of the above aspects of embodiments of the present invention, a thicker cladding layer can be deposited on a workpiece at high travel speeds, and at current level and heat input levels which are comparable to that of a single strip cladding method. Furthermore, even though the travel speed of the cladding operation is high a thicker cladding layer is formed. Thus, embodiments of the present invention provide significant advantage over known cladding methods. Furthermore, because embodiments of the present invention divide the total current input over multiple heads the maximum current experienced by any one cladding head is less than that of a single head. Because of this, embodiments of the present invention provide more control over the current and cladding operation. Therefore, embodiments of the present invention can provide more controllable cladding operations, chemically correct cladding coverage (acceptable dilution levels—e.g., 10% or less), while using less energy and providing a more beneficial heat input profile.

It is noted that the present invention is not limited by the type of curtain or strip electrodes to be utilized or the type of welding operation which can be performed, but can be used in many different types of welding operations with many different types of welding electrodes and electrode combinations.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. An electro-slag cladding apparatus, comprising:
a first cladding head capable of delivering a first strip cladding electrode to a workpiece using a first cladding signal from a first power source:
a second cladding head capable of delivering a second strip cladding electrode to said workpiece using a second cladding signal from a second power source, where said second cladding signal is not said first cladding signal; and
at least one magnetic steering probe positioned proximate to at least one of said first and second cladding heads,
wherein each of said first and second cladding heads is positioned and oriented relative to each other to deliver the respective first and second cladding electrodes to the same molten puddle on said workpiece during an electro-slag cladding operation,
wherein said first strip cladding electrode is in contact with said molten puddle at a first contact point and said second strip cladding electrode is in contact with said molten puddle at a second contact point,
wherein said first contact point is ahead of said second point in a cladding travel direction,
wherein at least one of said frist and second cladding heads is angled with respect to said workpiece such that the respective first or second strip cladding electrode impinges said molten puddle at an angle less than 90 degrees,
wherein each of said first and second cladding heads is oriented such that said respective first and second strip cladding electrodes have different stick out distances when said first and second strip cladding electrodes are contacting said molten puddle, and
wherein said at least one magnetic probe is positioned between said first and second cladding heads in said cladding travel direction.

2. The cladding apparatus of claim 1, wherein at least one of said first and second cladding heads are angled with respect to each other such that and angle between said first and second strip cladding electrodes is in the range of 0 to 75 degrees.

3. The cladding apparatus of claim 1, wherein each of said first and second cladding heads are oriented such that said respective first and second strip cladding electrodes contact said molten puddle at a distance in the range of 5 to 50 mm from each other.

4. The cladding apparatus of claim 1, wherein side edges of said first and second strip cladding electrodes are aligned with each other in said cladding direction.

5. The cladding apparatus of claim 1, wherein said first cladding head is disposed tandem with respect to said second cladding head in said cladding direction.

6. The cladding apparatus of claim 1, wherein said electro-slag cladding apparatus further comprises a controller configured to provide an electro-slag cladding signal to said first and second cladding heads to perform an electro-slag operation.

7. An electro-slag cladding system, comprising:
a first cladding head capable of delivering a first strip cladding electrode to a workpiece, wherein said first cladding head is coupled to a first power supply; and
a second cladding head capable of delivering a second strip cladding electrode to said workpiece, said second cladding head coupled to a second power supply,
at least one magnetic steering probe positioned proximate to at least one of said first and second cladding heads,
wherein each of said first and second cladding heads is positioned and oriented relative to each other to deliver the respective first and second cladding electrodes to the same molten puddle on said workpiece during an electro-slag cladding operation,
wherein said first strip cladding electrode is in contact with said molten puddle at a first contact point and said second strip cladding electrode is in contact with said molten puddle at a second contact point,
wherein said first contact point is ahead of said second contact point in a cladding travel direction,
wherein at least one of said first and second cladding heads is angled with respect to sais workpiece such that the respective first or second strip cladding electrode impinges sais molten puddle at an angle less than 90degrees,
wherein each of said first and second cladding heads is oriented such that said respective first and second strip cladding electrodes have different stick out distances when said first and second strip cladding electrodes are contacting said molten puddle, and
wherein said at least one magnetic probe is positioned between said first and second cladding heads in said cladding travel direction.

8. The cladding system in claim 7, wherein said first power supply provides a first cladding signal to said first cladding head and said second power supply provides a second cladding signal to said second cladding head which is different from said first cladding signal.

9. The cladding system of claim 7, wherein each of said first and second power supplies provides an electro-slag cladding signal to said respective first and second cladding heads.

10. The cladding system of claim 7, further comprising a control system coupled to each of said first and second power supplies to control an operation of said first and second power supplies.

11. The cladding system of claim 7, wherein each of said first and second power supplies operate in a constant voltage mode.

12. The cladding system of claim 7, wherein said first power supply provides a first cladding current to said workpiece and said second power supply provides a second current to said workpiece where said first current is higher than said second current.

13. The cladding system of claim 7, wherein said system provides a heat input into said workpiece in the range of 0.1 to 0.25 kJ/mm$^2$, and a total deposition rate in the range of 1 to 1.5 m$^2$/hr.

14. The cladding system of claim 7, wherein said first and second cladding heads are angled with respect to each other such that an angle between said first and second strip cladding electrodes is in the range of 0 to 75 degrees.

15. The cladding system of claim 7, wherein each of said first and second cladding heads is oriented such that said respective first and second strip cladding electrodes contact said molten puddle at a distance in the range of 5 to 50 mm from each other.

16. An electro-slag cladding system, comprising:
a first cladding head capable of delivering a first strip cladding electrode to a workpiece, wherein said first cladding head is coupled to a first power supply; and
a second cladding head capable of delivering a second strip cladding electrode to said workpiece, said second cladding head coupled to a second power supply; and
at least one magnetic steering probe positioned proximate to at least one of said first and second cladding heads,
wherein each of said first and second cladding heads is positioned and oriented relative to each other to deliver the respective first and second cladding electrodes to the same molten puddle on said workpiece during an electro-slag cladding operation,
wherein said first strip cladding electrode is in contact with said molten puddle at a first contact point and said second strip cladding electrode is in contact with said molten puddle at a second contact point,
wherein said first contact point is ahead of said second contact point in a cladding direction, and
wherein said at least one magnetic probe is positioned between said first and second cladding heads in said cladding travel direction.

17. The cladding system of claim 16, wherein each of said first and second cladding heads is oriented such that said respective first and second cladding electrodes contact said molten puddle normal to said molten puddle.

18. The cladding system in claim 16, wherein said first power supply provides a first cladding signal to said first cladding head and said second power supply provides a second cladding signal to said second cladding head which is different from said cladding signal.

19. The cladding system 16, wherein each of said first and second power supplies provides an electro-slag cladding signal to said respective first and second cladding heads.

20. The cladding system of claim 16, further comprising a control system coupled to each of said first and second power supplies to control an operation of said first and second power supplies.

21. The cladding system of claim 16, wherein each of said first and second power supplies operate in a constant voltage mode.

22. The cladding system of claim 16, wherein said first power supply provides a first cladding to said workpiece and said power supply provides a second current to said workpiece where said first current is higher than said second current.

23. The cladding of claim 16, wherein said system provides a heat input into said workpiece in the range of 0.1 to 0.25 kJ/mm$^2$, and a total deposition rate in the range of 1 to 1.5 m$^2$/hr.

24. An electro-slag cladding apparatus comprising:
a first cladding head capable of delivering a first strip cladding electrode to a workpiece using a first cladding signal from a first power source;
a second cladding head capable of delivering a second strip cladding electrode to said workpiece using a second cladding signal from a second power source, where said second cladding signal is not said first cladding signal; and
at least one magnetic steering probe positioned proximate to at least one of said first and second cladding heads,
wherein each of said first and second cladding heads is positioned and oriented relative to each other to deliver the respective first and second cladding electrodes to the same molten puddle on said workpiece during an electro-slag cladding operation,
wherein said first strip cladding electrode is in contact with said molten puddle at a first contact point and said second strip cladding electrode is in contact with said molten puddle at a second contact point,
wherein said first contact point is ahead of said second contact point in a cladding travel direction, and
wherein said at least one magnetic probe is positioned between said first and second cladding heads in said cladding travel direction.

25. The cladding apparatus of claim 24, wherein each of said first and second cladding heads are oriented such that said respective first and second strip cladding electrodes contact said molten puddle normal to said molten puddle.

26. An electro-slag cladding apparatus comprising:
a first cladding head capable of delivering a first strip cladding electrode to a workpiece using a first cladding signal from a first power source; and
a second cladding head capable of delivering a second strip cladding electrode to said workpiece using a second cladding signal from a second power source, where said second cladding signal is not said first cladding signal; and
at least one magnetic steering probe positioned proximate to at least one of said first and second cladding heads,
wherein each of said first and second cladding heads is positioned and oriented relative to each other to deliver the respective first and second cladding electrodes to the same molten puddle on said workpiece during an electro-slag cladding operation,
wherein said first strip cladding electrode is in contact with said molten puddle at a first contact point and said second strip cladding electrode is in contact with said molten puddle at a second contact point,
wherein said first contact point is ahead of said second contact point in a cladding travel direction,
wherein said first cladding head is disposed tandem with respect to said second cladding head in said cladding travel direction,
wherein said first and second cladding heads are angled with respect to each other such that an angle between said first and second strip cladding electrodes is in the range of 30 to 60 degrees in said cladding travel direction, and
wherein said at least one magnetic probe is positioned between said first and second cladding heads in said cladding travel direction.

* * * * *